US011228268B2

(12) United States Patent
Tsao et al.

(10) Patent No.: US 11,228,268 B2
(45) Date of Patent: Jan. 18, 2022

(54) ELECTRIC MOTOR CONTROLLING SYSTEM AND VIBRATION SUPPRESSION METHOD FOR USING THE SAME

(71) Applicant: Delta Electronics, Inc., Taoyuan (TW)

(72) Inventors: Chun-Chia Tsao, Taoyuan (TW); Chien-Ping Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/894,472

(22) Filed: Jun. 5, 2020

(65) Prior Publication Data

US 2021/0265935 A1  Aug. 26, 2021

(30) Foreign Application Priority Data

Feb. 20, 2020  (CN) .......................... 202010106784.1

(51) Int. Cl.
*H02P 1/46* (2006.01)
*H02P 23/04* (2006.01)
*H02P 23/00* (2016.01)
*B60L 15/20* (2006.01)

(52) U.S. Cl.
CPC .......... *H02P 23/04* (2013.01); *H02P 23/0004* (2013.01); *B60L 15/20* (2013.01); *B60L 2200/42* (2013.01); *B60L 2240/421* (2013.01); *B60L 2240/423* (2013.01); *B60L 2260/40* (2013.01)

(58) Field of Classification Search
CPC .... H02P 23/04; H02P 23/0004; H02P 25/032; B60L 15/20; B60L 2240/421; B60L 2240/423; B60L 2260/40; G05B 11/42; G05B 2219/41117
See application file for complete search history.

(56) References Cited

U.S. PATENT DOCUMENTS 5,631,833 A * 5/1997 Wada .................. B62D 5/0463
                                                          701/42

* cited by examiner

*Primary Examiner* — Karen Masih
(74) *Attorney, Agent, or Firm* — Chun-Ming Shih; HDLS IPR Services

(57) ABSTRACT

An electric motor controlling system used for vibration suppression of an electric vehicle is disclosed. The controlling system includes a PID-controller and a vibration suppression compensator. The PID-controller generates a basic torque command through performing a calculation based on input speed-error signal of the electric vehicle, the vibration suppression compensator generates a compensated torque command through performing a compensation gain procedure on the input speed-error signal. The vibration suppression compensator further receives a motor speed of the electric vehicle, sets its output as the compensated torque command when the motor speed is smaller than a preset active speed level, otherwise sets the output as 0. The controlling system generates an output torque command via adding up the basic torque command and the output of the vibration suppression compensator, and operates electric motor components of the electric vehicle according to the output torque command.

9 Claims, 5 Drawing Sheets (a)

(b)

ELECTRIC MOTOR CONTROLLING SYSTEM AND VIBRATION SUPPRESSION METHOD FOR USING THE SAME

BACKGROUND OF THE INVENTION

1. Field of the Invention

The invention relates to a controlling system, and in particularly to an electric motor controlling system, and a vibration suppression method applied to the electric motor controlling system.

2. Description of Related Art

Recently, an industrial vehicle, such as a forklift, automatic guided vehicle (AGV), etc., as one of the electric apparatuses has largest-scaled electrification and is well accepted by the market. The application environments of the industrial vehicles are mostly indoor spaces such as factories, warehouses, etc. These environments cannot stand waste gas which may damage people's health. Therefore, compared to the vehicles for people's livelihood, electrified industrial vehicles are more acceptable to the market.

Though current industrial vehicles still have basic requirements for maneuverability and riding comfortability; however, compare to the vehicles for people's livelihood, the transmission mechanisms and suspension systems applied to these industrial vehicles are relatively simpler under the consideration of cost. As a result, how to compensate the structural deficiency of industrial vehicles through controlling manners becomes the most important task to each company developing the industrial vehicles.

Usually, the controlling mode of an electric vehicle can be configured as either a torque control mode or a speed control mode. The torque control mode is usually applied to the vehicles for people's livelihood, such as electric motorcycles, electric vehicles, etc. In particular, an electric vehicle applied with the torque control mode transforms accelerator signal directly into a torque command. Therefore, a driver of the electric vehicle can adjust the accelerator of the electric vehicle to directly adjust the torque output of the electric motor, so as to control the electric vehicle to reach a target speed and move to a target location.

In comparison to the vehicles for people's livelihood, the industrial vehicles require stable speed. Moreover, a part of the electric industrial vehicles, such as forklifts, further require self-brakes while the accelerators are released. As a result, most of the industrial vehicles are applied with the speed control mode.

Refers to FIG. 1A, which is a block diagram showing an electric vehicle configured with speed control mode. As disclosed in FIG. 1A, a normal electric vehicle applied with speed control mode has at least one PID-controller 11, the PID-controller 11 receives input speed-error signal 12 of the electric vehicle for calculating a corresponding torque command 13. By way of the calculated torque command 13, the electric vehicle can control its electric motor components (such as traction motors, not shown in FIG. 1A). The PID-controller 11 is basically tracing the speed command made by the driver of the electric vehicle, which is to obtain a difference value between the accelerator signal made by the driver and the actual output value of the electric vehicle (such as actual motor speed), and then performs a linear operation according to the difference value for generating a corresponding control value, and then controls the operation of the electric motor components according to the generated control value.

However, the aforementioned speed control code cannot overcome vibration issues caused by mechanical characteristics of the transmission mechanism (such as gearbox, steering differential, etc.) of the electric vehicle while the electric vehicle is running, and driver's maneuverability and riding comfortability will be extremely affected.

Please refer to FIG. 1B as well, which is a schematic diagram showing non-linear dead zones of gears 2. As shown in FIG. 1B, two or more gears 2 will have at least one backlash distance W at joint part of gears 2. When the driver changes the input direction, the changed value of input cannot immediately affect the output value at the beginning, and it should be waiting for the input-side gear 2 to move for the backlash distance W to re-joint with other gear 2, and the changed value can then actually affect the output value. As a result, when the input direction is changed or the gears 2 are started with a non-joint status, the system model will generate a non-liner dead zone. In the dead zone, the driver's input cannot affect the output of the electric vehicle.

As mentioned above, the current linear controller (such as the PID-controller 11 as disclosed in FIG. 1A) cannot effectively deal with the aforementioned non-linear characteristics of the transmission mechanism (such as the gears 2 as disclosed in FIG. 1B). As a result, the electric vehicle may face problems such as poor response, abnormal twisting, vibration, etc., when the gears 2 inside the electric vehicle are located in the aforementioned dead zone. For example, it may cause vibration and reduce driver's riding comfortability when the traction motors of the electric vehicle work within specific operation zones. Therefore, unwilling work status may occur to the electric vehicle.

SUMMARY OF THE INVENTION

The object of the present invention is to provide an electric motor controlling system and vibration suppression method of the electric motor controlling system applied to an electric vehicle, which can restrain abnormal twisting and vibration caused by transmission mechanisms of the electric vehicle.

In one of the exemplary embodiments, the electric motor controlling system of the present invention is applied to an electric vehicle, and includes: a PID-controller, receiving an input speed-error signal of the electric vehicle, and performing a calculation based on the input speed-error signal for generating a basic torque command; and a vibration suppression compensator, arranged with the PID-controller in parallel, receiving the input speed-error signal and a motor speed of the electric vehicle, and performing a compensation gain procedure to the input speed-error signal for generating a compensated torque command.

Wherein, the vibration suppression compensator sets an output value as zero when the vibration suppression compensator determines that the motor speed is not smaller than a preset active speed level, and the vibration suppression compensator sets the output value as the compensated torque command when the vibration suppression compensator determines that the motor speed is smaller than the preset active speed level. The electric motor controlling system generates an output torque command by adding up the basic torque command and the output value of the vibration suppression compensator, and operates an electric motor component of the electric vehicle according to the output torque command.

In one of the exemplary embodiments, the vibration suppression method of the present invention is applied to an electric motor controlling system of an electric vehicle, and includes following steps:

Step a: receiving an input speed-error signal of the electric vehicle through a PID-controller of the electric motor controlling system;

Step b: performing a calculation based on the input speed-error signal by the PID-controller for generating a basic torque command;

Step c: receiving the input speed-error signal and a motor speed of the electric vehicle by a vibration suppression compensator of the electric motor controlling system;

Step d: performing a compensation gain procedure to the input speed-error signal by the vibration suppression compensator for generating a compensated torque command;

Step e: setting an output value of the vibration suppression compensator as zero by the vibration suppression compensator when the vibration suppression compensator determines that the motor speed is not smaller than a preset active speed level, and setting the output value as the compensated torque command by the vibration suppression compensator when the vibration suppression compensator determines that the motor speed is smaller than the active speed level;

Step f: generating an output torque command by adding up the basic torque command and the output value of the vibration suppression compensator by the electric motor controlling system;

Step g: transmitting the output torque command to an electric motor component of the electric vehicle by the electric motor controlling system for operating the electric motor component; and Step h: keeping to determine whether the electric vehicle is turned off or not by the electric motor controlling system, and re-executing the step a to the step g before the electric vehicle is turned off.

In comparison with related art, the present invention can restrain the abnormal twisting and vibration caused by the non-linear characteristics of the transmission mechanisms of the electric vehicle while the electric vehicle is running by way of a vibration suppression compensator, so as to improve the riding comfortability of the electric vehicle.

Furthermore, by fine adjusting the parameters used by the vibration suppression compensator, such as active speed level, gain values, bandwidths used by a low-pass filter or a high-pass filter, etc., the present invention can fit any kind of electric vehicles for achieving expected vibration suppression effect, which is convenient and user friendly.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1A:
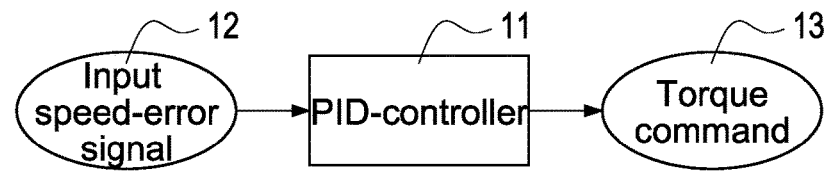
FIG. 1A is a block diagram showing a conventional electric vehicle configured with speed control mode.
Figure 1B:
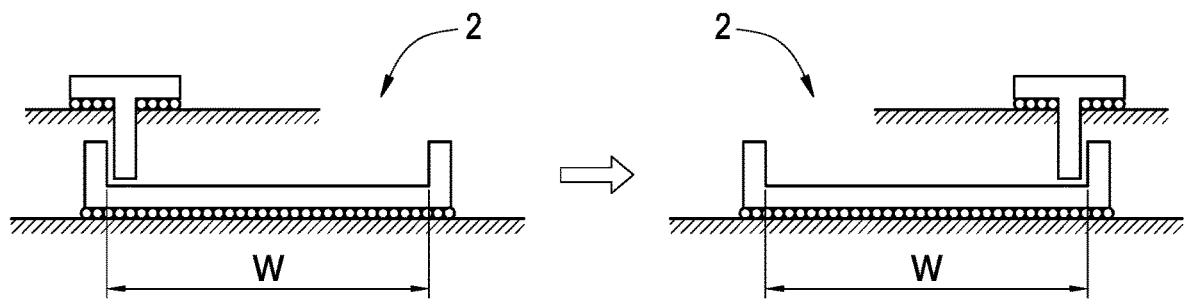
FIG. 1B is a schematic diagram showing non-linear dead zones of gears in the conventional electric vehicle.
Figure 2:
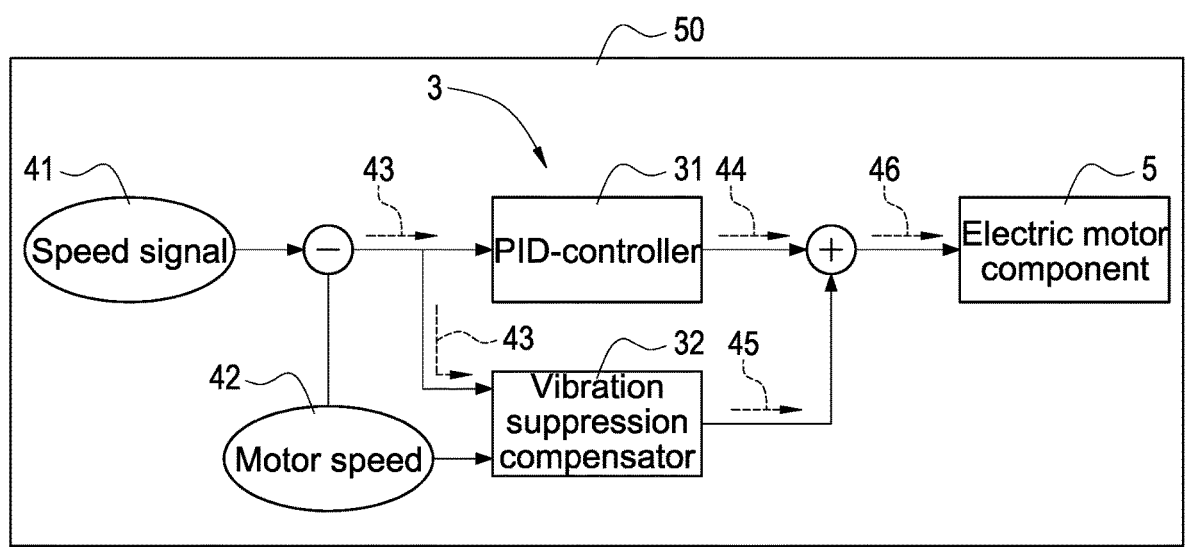
FIG. 2 is a block diagram of an electric motor controlling system of the present invention.

Refers to FIG. 2, which is a block diagram of an electric motor controlling system of the present invention. FIG. 2 discloses an electric motor controlling system 3, which is applied to an electric vehicle 50. The electric motor controlling system 3 is mainly applied to industrial electric vehicles which are arranged with speed control mode, such as forklifts, transporters, etc., but not limited thereto. The speed control mode is well-known in this technical field, detailed description is omitted here.

As shown in FIG. 2, the electric motor controlling system 3 has a proportional-integral-derivative (PID) controller 31 and a vibration suppression compensator 32. In the present embodiment, the PID-controller 31 is implemented to trace a speed command made by a driver of the electric vehicle 50, wherein the speed command is a signal corresponding to a rotating range of an accelerator of the electric vehicle 50 controlled by the driver. The vibration suppression compensator 32 is implemented to compensate a torque command output by the PID-controller 31 when one or more conditions of the electric vehicle 50 is satisfied, so as to use the compensated torque command to restrain abnormal twisting and vibration issue caused by non-linear characteristics of transmission mechanisms (such as gearbox, steering differential, etc., or their combination) inside the electric vehicle 50 while the electric vehicle 50 is running.

In one of the exemplary embodiments, the PID-controller 31 and the vibration suppression compensator 32 are implemented by different hardware and electrically connected with each other in parallel manner. In other one of the exemplary embodiments, the PID-controller 31 and the vibration suppression compensator 32 are written as firmware and are processed by same or different processors, so as to achieve respective functions. However, the above descriptions are only parts of the embodiments of the present invention, not limited thereto.

The PID-controller 31 is constituted by a proportional unit, an integral unit, and a derivative unit. A designer of the PID-controller 31 can adjust the characteristics of the PID-controller 31 by respectively setting a gain of the proportional unit (Kp), a gain of the integral unit (Ki), and a gain of the derivative unit (Kd); therefore, the PID-controller 31 can be appropriate to a system which basically works in a linear manner and has one or more dynamic characteristics that won't change over time. In particular, the PID-controller 31 is usually used as a feedback loop component, and the PID-controller 31 compares an output data of the system with a reference value, and the PID-controller 31 then calculates a new input value due to the difference obtained from the comparing result. By applying the new input value to the system, the output value of the system can achieve or remain at the reference value, so as to stabilize the entire system.

In general, the proportional unit, the integral unit, and the derivative unit of the PID-controller 31 are respectively corresponding to current error, past accumulated error, and future error. If any one of these units of the PID-controller 31 is unnecessary, the designer of the PID-controller 31 can directly set the characteristic of the unnecessary unit as zero. In one of the exemplary embodiments of the present invention, the electric motor controlling system 3 can be still implemented by utilizing the PID-controller 31 without the derivative unit (i.e., the characteristic of the derivative unit can be set as zero), so as to transform the PID-controller 31 into a PI controller, but not limited thereto.

As disclosed in FIG. 2, the PID-controller 31 receives an input speed-error signal 43 and performs a calculation based on the input speed-error signal 43 for correspondingly generating a basic torque command 44. In this embodiment, if abnormal twisting or vibration issue has not occurred to the electric vehicle yet, the electric motor controlling system 3 will directly output the basic torque command 44 generated by the PID-controller 31 as a final output torque command 46; that is, the electric motor controlling system 3 will not compensate the basic torque command 44, or the electric motor controlling system 3 will compensate the basic torque command 44 according to a compensated value which is zero.

It should be mentioned that the electric vehicle 50, in one embodiment, has an accelerator and a sensor (not shown). The accelerator is utilized for a driver of the electric vehicle 50 to operate, and the accelerator then generates speed signal 41 according to the driver's operation. The sensor is utilized for detecting motor speed 42 of one of the electric motor components 5 (such as a motor), wherein the electric motor components 5 is rotated for corresponding to the speed signal 41. In this embodiment, the electric motor controlling system 3 receives the speed signal 41 generated by the accelerator based on driver's operation, and receives the motor speed 42 detected by the sensor, and then subtracts the speed signal 41 and the motor speed 42 for obtaining the aforementioned input speed-error signal 43. In the present embodiment, the electric motor controlling system 3 utilizes the input speed-error signal 43 as an input signal of the PID-controller 31; that is, the electric motor controlling system 3 is operated in the speed control mode.

The vibration suppression compensator 32 and the PID-controller 31 are arranged in a parallel manner and electrically connected with each other; that is, the vibration suppression compensator 32 and the PID-controller 31 share the same input port and the same output port. In one of the exemplary embodiments, the vibration suppression compensator 32 receives the input speed-error signal 43, and then performs a compensation gain procedure to the input speed-error signal 43 for generating a compensated torque command 45. When the electric vehicle 50 occurs the abnormal twisting or vibration issue, the electric motor controlling system 3 adds up the basic torque command 44 generated by the PID-controller 31 and the compensated torque command 45 generated by the vibration suppression compensator 32 for generating and outputing a final output torque command 46. In other words, the electric motor controlling system 3 uses the compensated torque command 45 to compensate the basic torque command 44. As a result, the abnormal twisting or vibration issue caused by the non-linear characteristics of the transmission mechanisms inside the electric vehicle 50 can be eliminated by applying the compensated torque command 45 into the output torque command 46 while the electric vehicle 50 is running.

In particular, after applying the electric motor controlling system 3 of the present invention to any kind of the electric vehicle 50, a driver can do a riding test on the electric vehicle 50 for detecting and recording a specific speed or a speed range that the aforementioned abnormal twisting or vibration issue will occur to the electric vehicle 50 while the electric vehicle 50 is running.

In one of the exemplary embodiments, the driver can set an active speed level (such as the preset active speed level 6 disclosed in FIG. 3 and FIG. 4) for the electric motor controlling system 3 after the aforementioned riding test; that is, the electric motor controlling system 3 regards the preset active speed level 6 as the specific speed or the speed range that the electric vehicle 50 will occur the abnormal twisting or vibration issue. While the electric vehicle 50 is running, the vibration suppression compensator 32 keeps receiving the motor speed 42 from the sensor and determining whether the motor speed 42 is smaller than the preset active speed level 6. If the motor speed 42 is smaller than the preset active speed level 6, it means that the electric vehicle 50 is about to occur or is occuring the abnormal twisting or vibration issue. Therefore, it also indicates that the gears (not shown) of the transmission mechanisms inside the electric vehicle 50 is about to enter or is entering the above mentioned dead zone which accompanies with non-linear characteristics.

In order to solve such problem, the vibration suppression compensator 32 of the present invention sets its output value as the compensated torque command 45 when the vibration suppression compensator 32 determines that the motor speed 42 is smaller than the preset active speed level 6. In this scenario, the value of the output torque command 46 of the electric motor controlling system 3 equals a sum of the basic torque command 44 and the compensated torque command 45. In other words, the electric motor controlling system 3 of the present invention utilizes the value of the compensated torque command 45 to restrain the abnormal twisting or vibration issue possibly occurred to the electric vehicle 50 when the gears of the transmission mechanisms inside the electric vehicle 50 enter the aforementioned dead zone.

In addition, when the vibration suppression compensator 32 determines that the motor speed 42 is not smaller than the preset active speed level 6 (i.e., the motor speed 42 is larger than or equal to the preset active speed level 6), the vibration suppression compensator 32 directly set its output value as zero. In this scenario, even if the electric motor controlling system 3 generates the output torque command 46 by adding up the basic torque command 44 and the output value of the vibration suppression compensator 32, the value of the generated output torque command 46 still equals the value of the basic torque command 44. In other words, if the motor speed 42 is not smaller than the preset active speed level 6, it means that the gears of the transmission mechanisms inside the electric vehicle 50 are not entering the dead zone yet. In this scenario, the abnormal twisting or vibration issue is yet occurred to the electric vehicle 50, so it is unnecessary for the electric motor controlling system 3 to compensate the basic torque command 44 used to control the operation of the electric vehicle 50.

In one embodiment, the vibration suppression compensator 32 performs the compensation gain procedure to the input speed-error signal 43 for generating the compensated torque command 45 only when the vibration suppression compensator 32 determines that the motor speed 42 is smaller than the preset active speed level 6, and the vibration suppression compensator 32 directly sets its output value as zero without performing the compensation gain procedure when the vibration suppression compensator 32 determines that the motor speed 42 is not smaller than the preset active speed level 6. In this case, the system performance can be effectively saved.

In other embodiment, the vibration suppression compensator 32 can keep performing the compensation gain procedure to the input speed-error signal 43 for continually generating the compensated torque command 45, but the vibration suppression compensator 32 only outputs the compensated torque command 45 for being added to the basic torque command 44 when the vibration suppression compensator 32 determines that the motor speed 42 is smaller than the preset active speed level 6. In this case, the compensation efficiency of the electric motor controlling system 3 can be effectively improved.

In the exemplary embodiments of the present invention, the electric motor controlling system 3 generates the output torque command 46 for final operation by adding up the basic torque command 44 generated by the PID-controller 31 and the output value (i.e., either zero or the compensated torque command 45) of the vibration suppression compensator 32, and controls the operation of the electric motor components 5 of the electric vehicle according to the output torque command 46. In parts of the exemplary embodiments, the electric motor components 5 are electrically connected to the electric motor controlling system 3, but not limited thereto.

Figure 3:
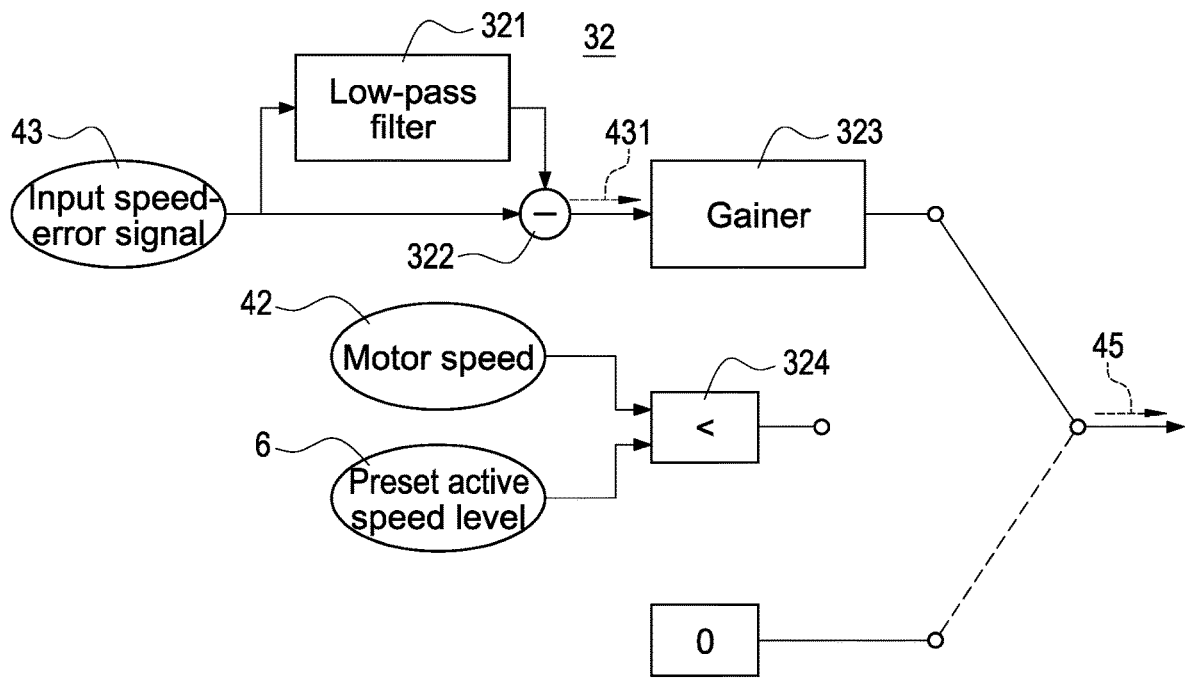
FIG. 3 is a block diagram of a vibration suppression compensator according to a first embodiment of the present invention.

FIG. 3 is a block diagram of a vibration suppression compensator according to a first embodiment of the present invention. Please refer to FIG. 2 and FIG. 3 together for illustrating the following each embodiment. In the embodiment shown in FIG. 3, the vibration suppression compensator 32 can be implemented by hardware, software, or their combination, and divided into multiple parts including a low-pass filter 321, a processor 322, a gainer 323, and a comparator 324, according to respective functions.

The low-pass filter 321 receives the input speed-error signal 43, and the low-pass filter 321 performs a filtering process to the input speed-error signal 43 for retrieving low frequency signal from the input speed-error signal 43. The processor 322 receives the input speed-error signal 43 and the low frequency signal of the input speed-error signal 43 from the low-pass filter 321, and the processor 322 then outputs a high frequency signal 431 of the input speed-error signal 43 by subtracting the input speed-error signal 43 and the low frequency signal. In the present invention, a driver can manually set the bandwidth of the low-pass filter 321, so as to ensure that the high frequency signal in the input speed-error signal 43 can be remained after the above calculation performed by the processor 322.

The gainer 323 receives the high frequency signal 431 generated by the processor 322, and performs a compensation gain procedure to the high frequency signal 431 for generating the compensated torque command 45.

In particular, the present invention firstly filters the low frequency signal from the input speed-error signal 43, and performs the compensation gain procedure only to the high frequency signal 431 of the input speed-error signal 43, so the compensated torque command 45 generated by the vibration suppression compensator 32 can directly and quickly react upon the received input speed-error signal 43. It should be mentioned that different electric vehicles may have different relationship between the input speed-error signal 43 and the output torque command 46. As a result, the driver is allowed to set a gain value used by the gainer 323 inside the vibration suppression compensator 32, so as to make the electric motor controlling system 3 of the present invention being appropriate to different kinds of electric vehicles more easily.

In addition, the vibration suppression compensator 32, in one of the exemplary embodiments, receives the motor speed 42 of the electric vehicle and the preset active speed level 6 through the comparator 324, and compares the motor speed 42 with the preset active speed level 6 by the comparator 324, so as to determine whether to set the output value of the vibration suppression compensator 32 as zero or as the compensated torque command 45 generated by the gainer 323.

As discussed above, different electric vehicles may have different arrangements of transmission mechanisms, so the speeds or speed ranges for the gears of the transmission mechanisms to enter the dead zone and cause the abnormal twisting or vibration issue may also be different. In order to deal with different electric vehicles, the present invention allows the driver of the electric vehicle to manually set the preset active speed level 6 used by the comparator 324 inside the vibration suppression compensator 32. In other words, the driver is allowed to set the aforementioned specific speed or speed range. Therefore, the electric motor controlling system 3 of the present invention can be easily applied to different kinds of electric vehicles.

In one of the exemplary embodiments, the vibration suppression compensator 32 sets its output value as zero when the motor speed 42 is not smaller than the preset active speed level 6 (i.e., the speed of the electric vehicle is not yet lower than the speed that may occur the abnormal twisting or vibration issue), and the vibration suppression compensator 32 sets its output value as the compensated torque command 45 when the motor speed 42 is smaller than the preset active speed level 6 (i.e., the speed of the electric vehicle is lower than the speed that may occur the abnormal twisting or vibration issue). In other words, when the motor speed 42 is not smaller than the preset active speed level 6 (i.e., the motor speed 42 is larger than or equal to the preset active speed level 6), the content of the output torque command 46 output by the electric motor controlling system 3 is a sum of the basic torque command 44 and zero, which is merely the basic torque command 44 without any compensation. On the other hand, when the motor speed 42 is smaller than the preset active speed level 6, the content of the output torque command 46 output by the electric motor controlling system 3 will be a sum of the basic torque command 44 and the compensated torque command 45.

As discussed above, the vibration suppression compensator 32 of the present invention is to perform the compensation gain procedure to the high frequency signal 431 of the input speed-error signal 43. In other embodiment, the vibration suppression compensator 32 may perform another filtering process to the input speed-error signal 43 directly through a high-pass filter.

Figure 4:
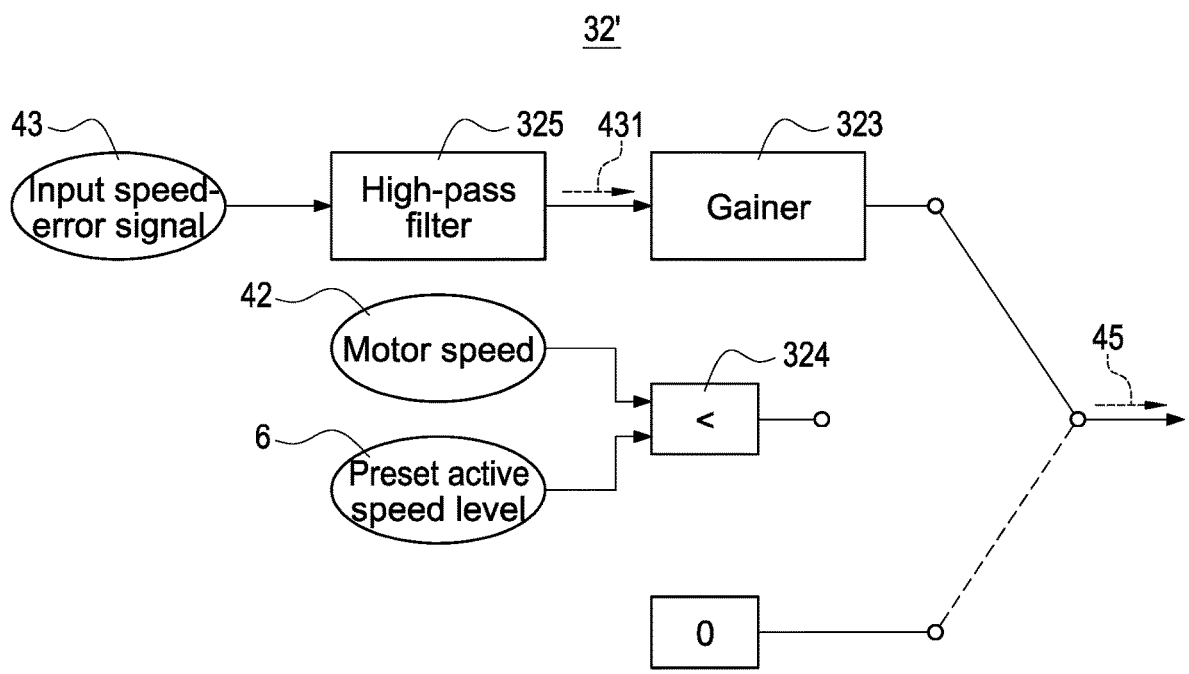
FIG. 4 is a block diagram of a vibration suppression compensator according to a second embodiment of the present invention.

FIG. 4 is a block diagram of a vibration suppression compensator according to a second embodiment of the present invention. FIG. 4 discloses another vibration suppression compensator 32'. The vibration suppression compensator 32' can be implemented by hardware, software, or their combination, and divided into multiple parts including a high-pass filter 325, a gainer 323, and a comparator 324, according to respective functions.

In this embodiment, the vibration suppression compensator 32' receives the input speed-error signal 43 through the high-pass filter 325, and performs the filtering process to the input speed-error signal 43 by the high-pass filter 325 for retrieving high frequency signal 431 directly from the input speed-error signal 43. In comparison to the embodiment disclosed in FIG. 3, it is unnecessary for the vibration suppression compensator 32' in this embodiment of FIG. 4 to additionally arrange with the processor 322 (shown in FIG. 3), and the calculation of subtracting the input speed-error signal 43 and the low frequency signal as discussed with respect to FIG. 3 can be omitted in this embodiment. Therefore, the processing efficiency in obtaining the high frequency signal 431 from the input speed-error signal 43 is well improved.

In the present invention, the driver is allowed to set the bandwidth of the high-pass filter 325, so as to ensure that the high frequency signal 431 in the input speed-error signal 43 can be remained after the filtering process performed by the high-pass filter 325.

It should be mentioned that the vibration restraining compensator 32 as shown in FIG. 3 is to first retrieve the low frequency signal from the input speed-error signal 43, and the vibration suppression compensator 32 then deletes the low frequency signal from the input speed-error signal 43 for obtaining the high frequency signal 431. In doing so, the noise in the obtained high frequency signal 431 will be relative less than the noise in the high frequency signal 431 directly retrieved by the high-pass filter 325 of the vibration suppression compensator 32' shown in FIG. 4.

Like the embodiment of FIG. 3, the gainer 323 in the embodiment of FIG. 4 receives the high frequency signal 431 filtered by the high-pass filter 325, and then performs the compensation gain procedure to the high frequency signal 431 for generating the compensated torque command 45. Also, the vibration suppression compensator 32' receives the motor speed 42 of the electric vehicle as well as the preset active speed level 6 through the comparator 324, and the comparator 324 compares the motor speed 42 with the preset active speed level 6, so as to determine whether to set the output value of the vibration suppression compensator 32' as zero or as the compensated torque command 45.

Similarly, the vibration suppression compensator 32' in the embodiment of FIG. 4 sets its output value as zero when the motor speed 42 is not smaller than the preset active speed level 6, and sets its output value as the compensated torque command 45 when the motor speed 42 is smaller than the preset active speed level 6.

Figure 5:
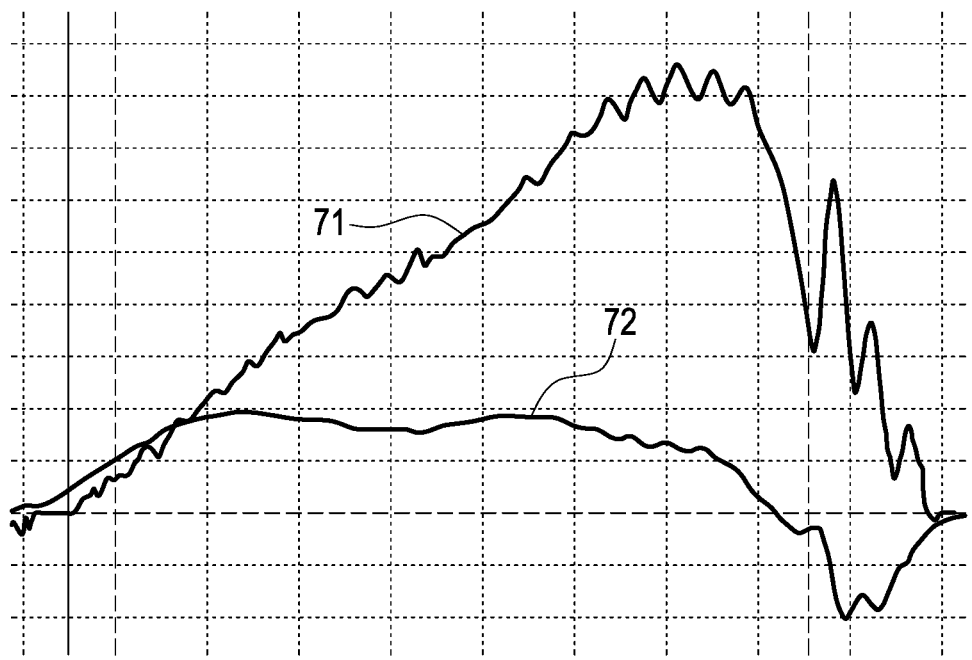
FIG. 5 is a schematic diagram showing a comparison between signals before the arrangement of the vibration suppression compensator and signals after the arrangement of the vibration suppression compensator.
Figure 5:

Please refer to FIG. 5, which is a schematic diagram showing a comparison between signals before the arrangement of the vibration suppression compensator and signals after the arrangement of the vibration suppression compensator.

FIG. 5(*a*) shows the experiential data of an electric vehicle while operating without applying the vibration suppression compensator 32 or 32' of the present invention. As shown in FIG. 5(*a*), a motor speed 71 will be reduced for following the reduction of a torque command 72. When the motor speed 71 is reduced to reach a certain value, critical ripples may occur (as shown at right side of FIG. 5(*a*)). In this case, the ripples will cause the electric vehicle to have abnormal twisting or vibration issue that makes a driver of the electric vehicle uncomfortable, and the electric vehicle will be unstable.

FIG. 5(*b*) shows the experiential data of an electric vehicle while operating with the vibration suppression compensator 32 or 32' of the present invention. It can be seen in FIG. 5(*b*) that a motor speed 81 will be reduced for following the reduction of a torque command 82; however, only few ripples will occur at an instant moment when the motor speed 81 is reduced to reach a certain value (as shown at right side of FIG. 5(*b*)), then the motor speed 81 is stably reduced to zero after that instant moment. As shown in FIG. 5(*a*) and FIG. 5(*b*), the abnormal twisting or vibration issue occurs to the electric vehicle can be effectively restrained by applying the vibration suppression compensator 32 or 32' of the present invention. In a conclusion, the driver's riding comfortability can be well improved.

Figure 6:
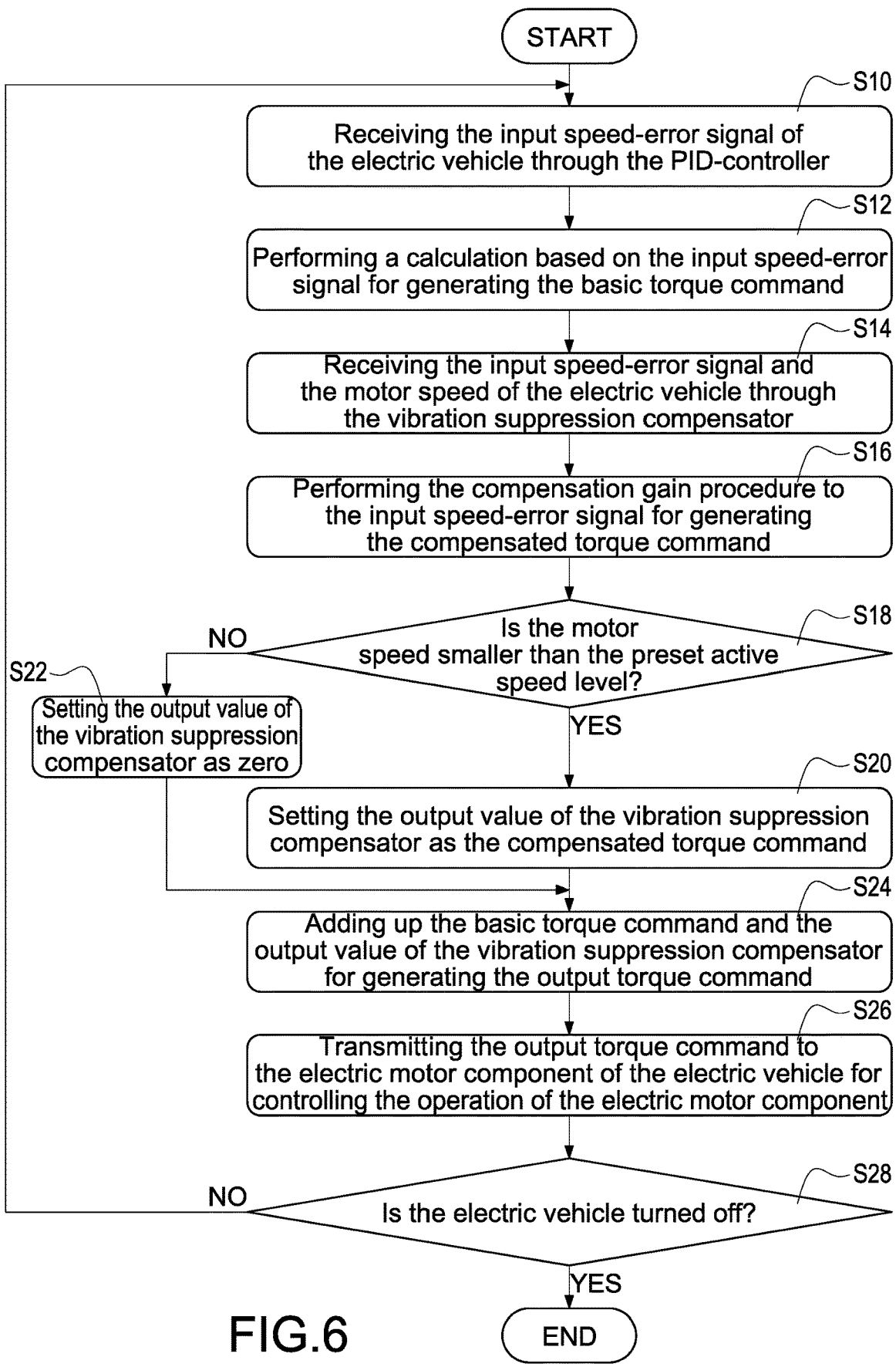
FIG. 6 is a flowchart of a vibration suppression method of the present invention.

FIG. 6 is a flowchart of a vibration suppression method of the present invention. FIG. 6 discloses a vibration suppression method used by an electric motor controlling system of the present invention, which is applied to an electric vehicle. The vibration suppression method here is mainly applied to the electric motor controlling system 3 as shown in FIG. 2, and the electric motor controlling system 3 can be arranged to any kind of the electric vehicles and electrically connected to electric motor components 5 inside the electric vehicle, so as to control the operation of the electric motor components 5.

As disclosed in FIG. 6, the electric vehicle receives the input speed-error signal 43 of the electric vehicle through the PID-controller 31 of the electric motor controlling system 3 (step S10), and performs a calculation based on the received input speed-error signal 43 by the PID-controller 31 for generating the basic torque command 44 (step S12). Specifically, in the step S10, the electric motor controlling system 3 is to receive the speed signal 41 and the motor speed 42 of the electric vehicle, and the electric motor controlling system 3 then subtracts the motor speed 42 and the speed signal 41 for obtaining the input speed-error signal 43.

Further, the electric motor controlling system 3 receives the input speed-error signal 43 and the motor speed 42 of the electric vehicle through the vibration suppression compensator 32 of the electric motor controlling system 3 (step S14), and then performs the compensation gain procedure to the input speed-error signal 43 by the vibration suppression compensator 32 for generating the compensated torque command 45 (step S16).

In one of the exemplary embodiments, the electric motor controlling system 3 is arranged with the vibration suppression compensator 32 as disclosed in FIG. 3. More specific, the vibration suppression compensator 32 in the step S16 is to perform the filtering process to the input speed-error signal 43 by the low-pass filter 321 for retrieving the low frequency signal from the input speed-error signal 43. Then, the processor 322 of the vibration suppression compensator 32 subtracts the input speed-error signal 43 and the low frequency signal for obtaining the high frequency signal 431 of the input speed-error signal 43. Next, the gainer 323 of the vibration suppression compensator 32 performs the compensation gain procedure to the high frequency signal 431 for generating the compensated torque command 45.

In other one of the exemplary embodiments, the electric motor controlling system 3 is arranged with the vibration suppression compensator 32' as disclosed in FIG. 4.

More specific, the vibration suppression compensator 32' in the step S16 is to perform the filtering process to the input speed-error signal 43 by the high-pass filter 325 for directly retrieving the high frequency signal 431 from the input speed-error signal 43. Then, the gainer 323 of the vibration suppression compensator 32' performs the compensation gain procedure to the high frequency signal 431 for generating the compensated torque command 45.

After the step S16, the vibration suppression compensator 32 or 32' further determines whether the current motor speed 42 of the electric vehicle is smaller than the preset active speed level 6 (step S18). For example, the vibration suppression compensator 32 or 32' can compare the motor speed 42 to the preset active speed level 6 by the comparator 324 disclosed in FIG. 3 and FIG. 4. In addition, the vibration suppression compensator 32 or 32' sets its output value as the compensated torque command 45 if the motor speed 42 is smaller than the active speed level (step S20), and set its output value as zero if the motor speed 42 is not smaller than the preset active speed level 6 (step S22).

Next, the electric motor controlling system 3 adds up the basic torque command 44 and the output value of the vibration suppression compensator 32 or 32' (which is zero from the step S22 or the compensated torque command 45 from the step S20) for generating the output torque command 46 (step S24). The electric motor controlling system 3 transmits the output torque command 46 to electric motor components 5 of the electric vehicle for controlling the operation of the electric motor components 5 according to the output torque command 46 (step S26).

In the present invention, the electric motor controlling system 3 keeps determining whether the electric vehicle is turned off or not (step S28), and continually executes the step S10 to the step S26 before the electric vehicle is turned off. By looping such steps, the output torque command 46 from the electric motor controlling system 3 can be continually compensated (by zero or by the compensated torque command 45) for the electric vehicle, so as to prevent the driver's riding comfortability from being affected by abnormal twisting or vibration occurs to the electric vehicle.

By way of the technical solution provided by the present invention, the electric vehicle can restrain the abnormal twisting or vibration issue caused due to the non-linear characteristics of the transmission mechanisms through the vibration suppression compensator 32 or 32', so as to improve the riding comfortability of the electric vehicle. Also, the driver is allowed to set the preset active speed level 6, the gain value used by the gainer 323, the bandwidth used by the low-pass filter 321 of the vibration restraining compensator 32, the bandwidth used by the high-pass filter 325 of the vibration suppression compensator 32' respectively according to the type of the electric vehicle, therefore, the vibration suppression compensator 32, 32' and the vibration suppression method provided by the present invention can be easily applied to different kinds of electric vehicles, which is very convenient and user friendly.

As the skilled person will appreciate, various changes and modifications can be made to the described embodiment. It is intended to include all such variations, modifications and equivalents which fall within the scope of the present invention, as defined in the accompanying claims.

What is claimed is:

1. An electric motor controlling system, applied to an electric vehicle, comprising:
   a proportional integral derivative (PID) controller, receiving an input speed-error signal of the electric vehicle, and performing a calculation based on the input speed-error signal for generating a basic torque command; and
   a vibration suppression compensator, arranged with the PID-controller in parallel, receiving the input speed-error signal and a motor speed of the electric vehicle, and performing a compensation gain procedure to the input speed-error signal for generating a compensated torque command;
   wherein the vibration suppression compensator sets an output value as zero when the vibration suppression compensator determines that the motor speed is not smaller than a preset active speed level, and the vibration suppression compensator sets the output value as the compensated torque command when the vibration suppression compensator determines that the motor speed is smaller than the preset active speed level;
   wherein the electric motor controlling system generates an output torque command by adding up the basic torque command and the output value of the vibration suppression compensator, and operates an electric motor component of the electric vehicle according to the output torque command.

2. The electric motor controlling system in claim 1, wherein the vibration suppression compensator comprises:
   a low-pass filter, performing a filtering process to the input speed-error signal for retrieving a low frequency signal from the input speed-error signal;
   a processor, obtaining high frequency signal from the input speed-error signal via subtracting the input speed-error signal and the low frequency signal;
   a gainer, performing the compensation gain procedure to the high frequency signal for generating the compensated torque command; and
   a comparator, comparing the motor speed with the preset active speed level.

3. The electric motor controlling system in claim 1, wherein the vibration suppression compensator comprises:
   a high-pass filter, performing a filtering process to the input speed-error signal for retrieving a high frequency signal from the input speed-error signal;
   a gainer, performing the compensation gain procedure to the high frequency signal for generating the compensated torque command; and
   a comparator, comparing the motor speed with the active speed level.

4. The electric motor controlling system in claim 1, wherein the PID-controller is a PI-controller with a derivative unit having a characteristic being set as zero.

5. A vibration suppression method of an electric motor controlling system, applied to the electric motor controlling system of an electric vehicle, comprising following steps of:
   a) receiving an input speed-error signal of the electric vehicle through a proportional-integral-derivative (PID) controller of the electric motor controlling system;
   b) performing a calculation based on the input speed-error signal by the PID-controller for generating a basic torque command;
   c) receiving the input speed-error signal and a motor speed of the electric vehicle through a vibration suppression compensator of the electric motor controlling system;
   d) performing a compensation gain procedure to the input speed-error signal by the vibration suppression compensator for generating a compensated torque command;
   e) setting an output value of the vibration suppression compensator as zero by the vibration suppression compensator when the vibration suppression compensator determines that the motor speed is not smaller than a preset active speed level, and setting the output value as the compensated torque command by the vibration suppression compensator when the vibration suppression compensator determines that the motor speed is smaller than the preset active speed level;
   f) generating an output torque command by adding up the basic torque command and the output value of the vibration suppression compensator by the electric motor controlling system;

g) transmitting the output torque command to an electric motor component of the electric vehicle by the electric motor controlling system for operating the electric motor component; and h) keeping to determine whether the electric vehicle is turned off or not by the electric motor controlling system, and re-executing the step a) to the step g) before the electric vehicle is turned off.

6. The vibration suppression method in claim 5, wherein the step a) is to receive a speed signal and the motor speed of the electric vehicle through the electric motor controlling system, and obtaining the input speed-error signal via subtracting the motor speed and the speed signal.

7. The vibration suppression method in claim 5, wherein the step d) comprises following steps of:

d11) performing a filtering process to the input speed-error signal by a low-pass filter of the vibration suppression compensator for retrieving a low frequency signal from the input speed-error signal;

d12) subtracting the input speed-error signal and the low frequency signal by a processor of the vibration suppression compensator for obtaining a high frequency signal from the input speed-error signal; and d13) performing the compensation gain procedure to the high frequency signal by a gainer of the vibration suppression compensator for generating the compensated torque command;

wherein, the step e) is to compare the motor speed with the preset active speed level by a comparator of the vibration suppression compensator.

8. The vibration suppression method in claim 5, wherein the step d) comprises following steps of:

d21) performing a filtering process to the input speed-error signal by a high-pass filter of the vibration suppression compensator for retrieving a high frequency signal from the input speed-error signal; and d22) performing the compensation gain procedure to the high frequency signal by a gainer of the vibration suppression compensator for generating the compensated torque command;

wherein, the step e) is to compare the motor speed with the preset active speed level by a comparator of the vibration suppression compensator.

9. The vibration suppression method in claim 5, wherein the preset active speed level indicates a specific speed or a speed range of the electric vehicle.

* * * * *